US005743642A

United States Patent [19]
Fons

[11] Patent Number: 5,743,642
[45] Date of Patent: Apr. 28, 1998

[54] METHOD FOR COMPENSATING EARTH SURFACE TEMPERATURES FOR THE SKYWARD EFFECT THEREON

[76] Inventor: Lloyd C. Fons, 14410 Cindywood Dr., Houston, Tex. 77079

[21] Appl. No.: 668,814

[22] Filed: Jun. 24, 1996

[51] Int. Cl.[6] .......... G01N 25/00; E21B 47/06; G01K 13/00

[52] U.S. Cl. .......... 374/45; 73/152.12; 374/136

[58] Field of Search .......... 374/45, 136; 73/152.12

[56] References Cited

U.S. PATENT DOCUMENTS

| | | | |
|---|---|---|---|
| 3,217,550 | 11/1965 | Birman | 73/152.12 |
| 3,363,457 | 1/1968 | Duehle et al. | 73/152.12 |
| 3,805,587 | 4/1974 | Sayer | 73/152.12 |
| 3,892,128 | 7/1975 | Smith, Jr. | 73/152.13 |
| 4,120,199 | 10/1978 | Mufti | 73/152.12 |
| 4,476,716 | 10/1984 | Fons | 73/152.12 |
| 4,490,613 | 12/1984 | Brame | 250/253 |
| 4,517,458 | 5/1985 | Barringer | 250/253 |
| 4,947,682 | 8/1990 | Anderson et al. | 374/136 |
| 5,281,024 | 1/1994 | Fons | 374/45 |
| 5,524,483 | 6/1996 | Fons | 374/136 |

FOREIGN PATENT DOCUMENTS

| | | | |
|---|---|---|---|
| 0940114 | 6/1982 | U.S.S.R. | 374/136 |
| 1043519 | 9/1983 | U.S.S.R. | 374/136 |

*Primary Examiner*—Diego F. F. Gutierrez

[57] ABSTRACT

A method for compensating measured earth surface temperatures for the effects which skyward temperatures have upon such measured temperatures. Also, methods for employing compensated earth surface temperatures to determine the likelihood of subsurface features existing beneath locations within a selected geographical area.

16 Claims, 1 Drawing Sheet

METHOD FOR COMPENSATING EARTH SURFACE TEMPERATURES FOR THE SKYWARD EFFECT THEREON

BACKGROUND OF THE INVENTION:

1. Field of the Invention.

The present invention relates to methods for compensating measured earth surface temperatures for the effect of skyward conditions upon such temperatures. More particularly, the present invention relates to methods for using temperatures measured in a skyward direction for compensating measured temperatures of the earth's surface. The earth surface temperatures compensated according to the method of the present invention are useful for determining subsurface features, such as the presence or absence of oil, gas, or mineral deposits.

2. Description of Pertinent Art.

It has been known since at least the Middle Ages that the earth's surface at locations above mineral deposits, such as metal ores, is warmer than the earth's surface above locations where such mineral deposits do not occur. Early reports describe the selective melting of frost at locations above mineral deposits, while the frost at other locations, where no mineral deposits were found, remained unmelted.

In U.S. Pat. No. 4,476,716 (Fons), incorporated by reference into this application in its entirety, I disclosed methods for predicting the likelihood that oil or gas deposits are present at unexplored depths below selected locations on the earths surface. These methods were based upon the discovery that the temperature of the earth at a given depth below a location above an oil or gas deposit tends to be lower than temperatures at the same depth at other locations in the same geographic area where oil or gas deposits do not exist.

One method taught in U.S. Pat. No. 4,476,716 for predicting the likelihood of an oil or gas deposit below a location comprises: determining a first temperature (Tq) at a first known depth beneath a selected location; determining a second temperature, (Tr.), representative of the average temperature for the first known depth within a geographic area within which the location is situated; and determining a temperature difference, $\Delta T = Tq - Tr.$, where, for a negative value of $\Delta T$, it is likely that an oil or gas deposit is present beneath the location. As exemplified by claims 11 and 12 of U.S. Pat. No. 4,476,716, the method may be applied where the first known depth is about the surface of the earth. The accuracy of predictions made using these methods are dependent upon the accuracy of temperature data at the locations under study. At Col. 5, lines 14–18, of U.S. Pat. No. 4,476,716 I stated, "Where surface and ambient temperatures are very accurately determined, temperature differences in the range of 1° F. may be used to predict the presence of oil or gas deposits at selected locations". In U.S. Pat. No. 4,476,716 I disclose that accurate surface temperature data and atmospheric temperature may be obtained for some locations in the form of annual average temperatures from Geological and Meteorological surveys.

In U.S. Pat. 5,524,483 (Fons), incorporated herein in its entirety by reference, I disclose methods for predicting the likelihood of the presence of oil or gas deposits beneath locations within a geographic area on the earth's surface employing earth surface temperatures at the locations. The methods disclosed in U.S. Pat. No. 5,524,483 comprise measuring earth surface temperatures at a plurality of points, (each having similar surface features), during a time period during which ambient conditions, (for example: ambient temperatures, incident radiation, degree of cloud cover, precipitation, wind and atmospheric humidity and rarity), are similar for minimizing the variability of earth surface temperatures from point to point due to changes in such ambient conditions. Points having lower than average earth surface temperatures were identified as being more likely to have oil or gas deposits beneath them than were other points having higher than average earth surface temperatures.

In U.S. Pat. No. 5 281 024 (Fons) incorporated herein in its entirety, I disclose methods for locating deposits of soil having high percolation rates in areas having both permeable and impermeable soils employing earth surface temperature measurements. According to the methods of U. S. Pat. No. 5,281,024, locations having higher earth surface temperatures are more likely to have permeable soils present than are locations in the same area having higher earth surface temperatures.

Earth surface temperatures are affected not only by seasonal changes in temperature, but also by more immediate factors, such as diurnal effects, variation in topographical features, including soil type, soil moisture, reflectance/emissivity of the earth's surface, vegetative cover, elevation above/below sea level, grade and other surface features as well as changes in ambient conditions such as incident radiation (sunlight), ambient temperatures, atmosphere humidity, wind desiccation, cloud cover, atmospheric clarity, and precipitation,. These factors tend to create variations in measured earth surface temperatures which mask any temperature differences between two or more locations arising from the presence or absence of oil or gas deposits, or of other subsurface features beneath the locations. While time averages, such as average annual earth surface temperatures as disclosed in U.S. Pat. No. 4,476,716, tend to eliminate the masking effect of these factors such that earth surface temperatures differences due to the presence or absence of oil or gas deposits or other subsurface features can be observed, obtaining such time average temperature data is not economically or functionally practical. Selecting a time period during which these factors change little, as disclosed in U.S. Pat. No. 5,524,483, allows collection of earth surface temperature data which is useful for determining subsurface features. However, as will be seen below, ambient conditions tend to change, and thus corrupt the earth surface temperature data collected, even during short time periods.

A practical method for acquiring earth surface temperature data relatively unaffected by the above factors, especially changes in ambient conditions, and which is useful for determining the presence or absence of subsurface features, such as oil, gas or mineral deposits, is desirable

SUMMARY OF THE INVENTION

Now, according to the method of the present invention, I have discovered improved methods for acquiring earth surface temperature data which is useful for determining the presence or absence of subsurface features, such as oil, gas, or mineral deposits, beneath selected earth surface locations, and improved methods for selecting locations suitable for exploring for oil, gas, or mineral deposits.

The present invention is based upon my discovery that earth surface temperatures at locations are significantly affected by ambient conditions in a skyward direction above such locations. Changes in such ambient conditions have a rapid and significant effect upon measured values of earth surface temperatures at the locations and tend to mask temperature differences between locations which would indicate the presence or absence of subsurface features, such as oil, gas or mineral deposits at such locations.

In one embodiment, the present invention comprises:

a) Selecting an area of interest upon the earth's surface;

b) Measuring an earth surface temperature, $T_L$ at each location of a plurality of locations within the selected area and simultaneously measuring a skyward temperature, $T_S$, in a vertical direction above each of the locations;

c) Determining the average temperature, $T_{SA}$, of the skyward temperatures, $T_S$, measured above each location;

d) Determining a normalized temperature, $T_{NS}$, for each skyward temperature according to the formula:

$$T_{NS}=T_{SA}-T_S;$$

and f) Determining for each location a compensated earth surface temperature, $T_{CL}$, according to the formula:

$$T_{CL}=T_L-(C)(T_{NS}),$$

where C is a constant proportional to the effect of skyward temperature upon the measured earth surface temperature, $T_L$.

"By following the method of the above embodiment of the invention, earth surface temperatures compensated for the effect of skyward ambient conditions may be obtained for a plurality of locations, which compensated earth surface temperatures, $T_{CL}$ may then be compared for determining which locations among the plurality of locations might have desirable sub surface features. An average, $T_{CLA}$ of all the compensated earth surface temperatures, $T_{CL}$ is determined. Then, in an area where mineral deposits are likely, locations in the area having values of $T_{CL}$ higher than average compensated earth surface temperature $T_{CLA}$ more likely to have mineral deposits beneath them than are locations in the area having values of $T_{CL}$ lower than average compensated earth surface temperature $T_{CLA}$. Similarly, in an area where oil or gas deposits are likely, locations in the area having values of $T_{CL}$ lower than average compensated earth surface temperature $T_{CLA}$ are more likely to have oil or gas deposits beneath them than are locations in the area having values of $T_{CL}$ higher than average compensated earth surface temperature $T_{CLA}$."

DESCRIPTION OF PREFERRED EMBODIMENTS OF THE INVENTION

Figure 1:
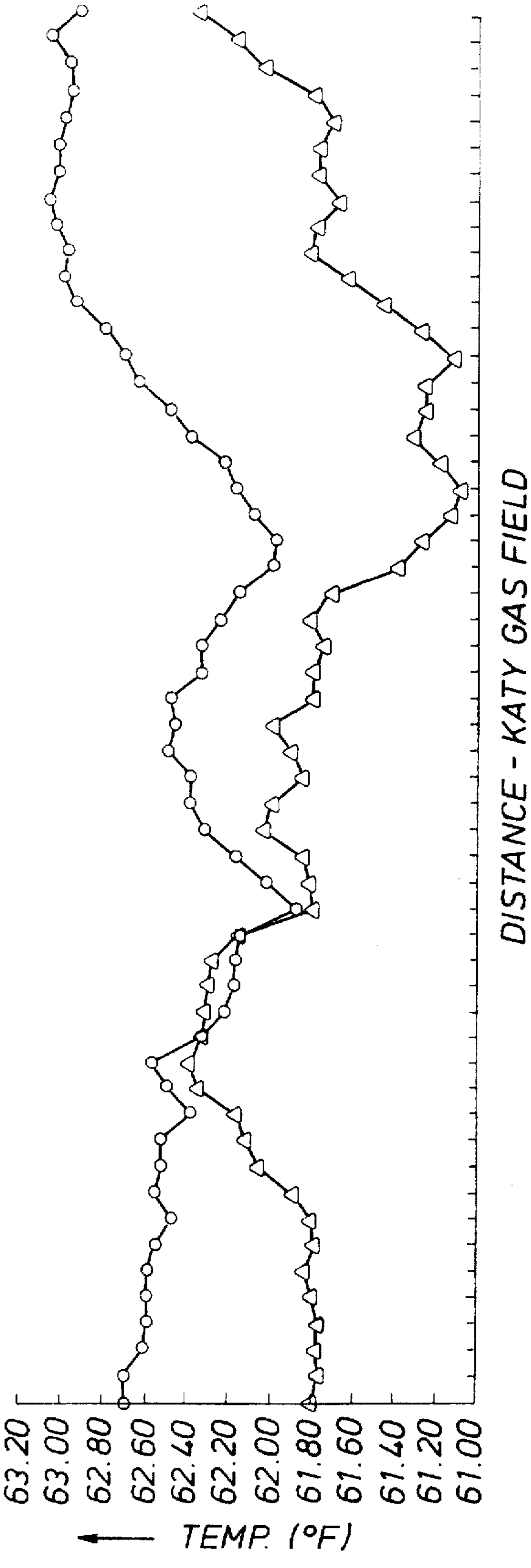
FIG. 1 of the drawings shows graphical plots of measured earth surface temperatures at locations along Traverse 1 and Traverse 2 of Example 1.

As noted above, measured earth surface temperature values are affected by ambient conditions, such as incident radiation(sunlight), ambient temperatures, atmospheric humidity, wind dessication, cloud cover, atmospheric clarity, precipitation, etc. I have discovered that these ambient conditions are subject to rapid changes, even when, to a visual observer, the ambient conditions appear stable. Further, I have discovered that such changes in ambient conditions have significant effects upon earth surface temperature measurements which can mask differences in earth surface temperature measurements between locations which differences could indicate the presence or absence of subsurface features at the locations.

According to the present invention, I have discovered that measured earth surface temperatures can be compensated for changes in ambient conditions employing skyward temperatures, as described above in the Summary Of Invention. Differences in compensated earth surface temperatures between locations can then be compared to determine whether sought for subsurface features may exist below one or another of the locations.

In geographical areas where oil or gas deposits are likely to be found, locations having lower compensated earth surface temperatures are more likely to have oil or gas deposits beneath them than are other locations in the same geographical area having higher compensated earth surface temperatures. Likewise, in geographical areas where mineral deposits, such as metal ores, are likely to be found, locations having higher compensated earth surface temperatures are more likely to have mineral deposits beneath them than are locations having lower compensated earth surface temperatures.

Factors other than ambient conditions and subsurface features can affect measured earth surface temperatures. For example, seasonal climatic changes, and differences in earth surface features such as soil type, reflectance/emmissivity of the surface, vegetative cover, elevation above or below sea level and other topographical features also can affect the values of measured earth surface temperatures. As set out in U.S. Pat. No. 5,524,483, steps may be taken for reducing the effect of these other factors upon measured earth surface temperatures. For example, earth surface temperatures may be measured at locations within a geographical area during a period when seasonal climatic changes, from beginning to end of the period, are not substantial.

The effect of differences in topographical features upon earth surface temperatures measured at locations within a geographical area may be reduced by selecting locations having similar topographical features. Visual inspection of locations for similarity of topographical features is generally sufficient. Roads, paved and unpaved, and bar ditches often provide extensive areas having similar topographical features and can be used to advantage as locations for measuring earth surface temperatures.

Heat is continuously exchanged between the earth's surface, the superposed atmosphere and extra terrestrial entities, such as the sun and space. A substantial portion of this heat exchange is accomplished by radiation. That is, heat is continuously radiated from the earth into the atmosphere and, in clear weather, into space. Additionally, heat is continuously radiated from the atmosphere, from space and, when present, from the sun to the earth's surface. The net radiative heat transfer, either to or from the earth's surface, has a substantial effect upon the measured value of the earth's surface temperature.

This effect of radiative heat transfer upon measured earth surface temperatures is well known and widely observed. For instance, cloud cover during the day tends to reduce earth surface temperatures, compared with temperatures measured in clear conditions, because the clouds prevent heat radiation from the sun reaching the earth's surface. The same cloud cover at night, however, tends to increase the earth's surface temperature, again compared to clear conditions, because the clouds prevent heat from the earth radiating into space. Also, it is known that moisture content of the atmosphere affects radiation to and from the earth's surface because the water comprising the moisture absorbs infra-red radiation.

In addition to the observable ambient conditions, such as presence or absence of the sun or of clouds, relative humidity, etc., I have discovered that conditions in a skyward direction above a location on the earth's surface are subject to more subtle effects which can change rapidly and which have a significant effect upon the measured value of the earth's surface temperature at the location. I have also discovered that such changes in skyward conditions above a location can be sensed and quantified as changes in temperature measured in a skyward direction above the location. Additionally, I have discovered that such changes in skyward conditions have a rapid and substantial effect upon earth surface temperatures measured at the location. The effect of the changes in skyward conditions upon measured earth surface temperatures at locations in a geographical area can mask differences in earth surface temperatures between locations which would indicate the presence or absence of sub surface features beneath the locations.

According to the present invention, I have discovered methods for compensating measured earth surface temperatures for such changes in skyward conditions such that the compensated earth surface temperatures are more useful for predicting the presence or absence of sought for sub surface features.

In a preferred embodiment, the method of the present invention comprises:

selecting a geographic area beneath which desirable subsurface features might be found;

selecting a plurality of locations throughout the geographic area having similar topographical features, for reducing the variability of earth surface temperatures among the locations;

measuring an earth surface temperature, $T_L$, for each location of the plurality of locations and simultaneously measuring a skyward temperature, $T_S$ above each location of the plurality of locations;.

determining a normalized temperature, $T_{NL}$, for each location of the plurality of locations according to the formula $$T_{NL}=T_L-T_{LA}$$

where $T_{LA}$ is the average of all the earth surface temperatures, $T_L$, for the plurality of locations;

determining a normalized temperature, $T_{NS}$, for each skyward temperature above a location of the plurality of locations according to the formula $$T_{NS}=T_{SA}-T_S$$

where $T_{SA}$ is the average of all the skyward temperatures, $T_S$, above the plurality of locations;

determining a compensated normalized temperature, $T_{NCL}$ for each location of the plurality of locations according to the formula $$T_{NCL}=T_{NL}-(C)(T_{NS})$$

where C is a constant proportional to the effect of skyward temperature, $T_S$, upon the measured earth surface temperature, $T_L$, at each location of the plurality of locations "The constant C may be experimentally determined, as follows:

At a location, L, determining a first normalized earth surface temperature $T_{NL-1}$ and a first normalized skyward temperature $T_{NS-1}$ at a first time $t_1$; determining a second normalized earth surface temperature, $T_{NL-2}$ and a second normalized skyward temperature $T_{NS-2}$ at a second time $t_2$; and calculating a value for C according to the equation $$C=(T_{NL-1}-T_{NL-2})/(T_{NS-2}-T_{NS-1}).$$

The earths surface is, over the course of a day, generally undergoing either a process of heating or cooling due primarily to the effects of diurnal changes. That is, as the day closes and the amount of radiation received from the sun declines, the earth's surface begins to cool this cooling effect extends into the night as heat from the earth is radiated into the sky. Later, as morning approaches, the earth's surface begins to heat in response to the returning sun. This heating continues during the day until evening approaches and radiation from the sun again decreases. Occasionally, the diurnal effect upon the earth's surface temperature is masked, as by heavy cloud cover, by precipitation or by other weather changes. These diurnal changes and weather changes can also affect skyward temperatures measured according to the above method. When diurnal changes and weather changes are having an effect upon earth surface temperatures or skyward temperatures, such effects of the diurnal changes and weather changes must be taken into account. That is, in the above method the measured earth surface and skyward temperatures must be adjusted for any significant temperature changes due to diurnal changes and weather changes or, preferably, the earth surface and skyward temperature measurements will be made during a time period during which the diurnal and weather changes effects upon such temperature measurements are not significant. Generally, during time periods of from about 2 to 4 hours at about midday or late at night, earth surface and skyward temperature measurements can be made without significant effect by diurnal changes. For the case where diurnal changes and weather changes do have a significant effect upon the measured earth surface and/or skyward temperatures, the rates of change of such measured temperatures due to diurnal changes and weather changes may be determined by means well known in the art, and the measured temperatures may then be adjusted for the effect of the diurnal changes and weather changes.

The proportionality constant C indicates the effect of a change of skyward temperature upon the associated measured earth surface temperature. That is, for a change, $\Delta T_s$, in skyward temperature above a location, the measured earth surface temperature at the location will change by an amount $C(\Delta T_s)$. For situations where ambient conditions are relatively steady during the time period when earth surface temperatures and skyward temperatures are measured, a single value for C may be used for all calculations in the method above. For example, if the temperature measurements are made at night under a clear sky, then a single value for C may be used for all calculations. Likewise, if temperature measurements are made at night and the sky has a solid cloud cover, then the same value of C may be used for all calculations. Similarly, if temperature measurements are made during the day and the sky is either clear or has a solid cloud cover during the entire period during which temperature measurements are being made, then the same value of C may be used for the calculations. The same value for C may not be used for all calculations if skyward conditions are undergoing a substantial change during the time period when temperature measurements are being made, such as periods when radiation from the sun is causing rapid heating of the surface, or the earth's surface is undergoing rapid radiative cooling or periods when the weather is in a process of change, such as clearing or becoming cloudy. In such cases, it may be necessary to determine a value for C for each skyward temperature measured. Preferably, measurements of the earth surface temperatures and skyward temperatures for all locations are made during a time period during which observable ambient conditions are stable and one value of C may be used for calculation of compensated earth surface temperatures, $T_{cl}$, for all locations.

The constant C may be experimentally determined. For example:

measuring, at a first time, a first earth surface temperature $T_{L-1}$ and a first skyward temperature, $T_{S-1}$ at a location;

measuring, at a second time, a second earth surface temperature $T_{L-2}$ and a second skyward temperature, $T_{S-2}$ at the same location; and calculating a value for C according to the formula:

$$C=(T_{L-1}-T_{L-2})/(T_{S-2}-T_{S-1})$$

This value for C may then be used to calculate compensated earth surface temperatures at the other locations within the geographical area. Preferably however, values for C are calculated, as above, for a plurality of locations within the geographical area where compensated earth surface temperatures are desired. Then a single value of C is selected which gives the mathematical best fit for the value of C at all of the locations in the geographical area. By this preferred method, the effect of any error which may be made in calculation of a value for C any one location upon the compensated earth surface temperature values will be reduced.

Experience may indicate a value for C. For example, after many experiments in Southeast Texas, I have found that C of value 0.5 is a good first approximation for experimental runs where earth surface and skyward temperatures are measured during periods of visually clear weather at night, and such value can be used to calculate compensated earth surface temperature values from temperature data collected under similar circumstances.

Compensated normalized earth surface temperatures, $T_{NCL}$, determined for locations within a geographical area, according to the methods of the present invention, are useful for identifying locations having higher or lower than average earth surface temperatures, after skyward effects are removed. Such compensated normalized earth surface temperatures, $T_{NCL}$, are useful for identifying locations within a geographical area which are likely to have certain subsurface features.

For example, in a geographical area beneath which oil or gas deposits are likely to be found, then locations within the geographical area having compensated normalized earth surface temperatures, $T_{NCL}$, of negative value are more likely to have oil or gas deposits beneath them than are locations within the geographical area having compensated normalized earth surface temperatures, $T_{NCL}$, of positive value. Likewise, in geographical areas likely to have mineral deposits, such as metal ores, locations in the geographical area having compensated normalized earth surface temperatures of positive value are more likely to have such mineral deposits beneath them than are locations having compensated normalized temperature values of negative value.

In the methods of the present invention, earth surface temperatures and skyward temperatures may be measured with any applicable temperature measuring device which provides sufficient precision and reproducibility of temperature measurement. Temperature measurements are preferably made to a precision of about ¼° F., (about 1/10° C.), or less. Compensated temperature differences of as little as ½° or less may be significant in determining whether sought for subsurface features are likely to be found beneath selected locations. Reproducibility of temperature measurements is equally important as precision of the measuring instrument. Preferably temperature measuring instruments employed in practice of the present invention will have no substantial drift. For temperature measuring instruments which do have substantial drift, it is preferable that the rate of such drift is known and that measured temperatures are corrected for such drift before being used in the methods of the present invention.

Temperature measuring instruments which contact the earth, such as thermometers and thermocouples, may be used to measure earth surface temperatures. Also remote sensing instruments, such as infra-red sensors, may be used to measure earth surface temperatures.

Remote sensing instruments, such as infra-red sensors, are required for measuring skyward temperatures. The skyward temperature values are affected by conditions in the lower atmosphere, the upper atmosphere and, where visible, space. The remote sensing instrument employed for measuring skyward temperatures is preferably directed vertically upward and is mounted at substantially the same elevation above the earth's surface as is the temperature sensor employed for measuring the earth's surface temperature. As demonstrated in Example 1 of U.S. Pat. No. 5,281,024, near surface atmospheric conditions have a substantial effect upon measured temperature values and care should be taken to ensure that skyward temperatures are measured for a skyward area substantially vertically above the earth's surface where earth surface temperatures are measured.

Preferably, infra-red sensors are employed in the methods of the present invention for measuring both earth surface temperatures and skyward temperatures. Also, infra-red sensors having heightened sensitive to temperatures in the ranges expected for earth surface temperatures and skyward temperatures are preferably employed. Temperature measurements can be made rapidly, with good precision, using infra-red sensors. Drift, or other lack of repeatability, in temperature readings obtained with infra-red sensors can be eliminated or compensated for by using good quality sensors and following the manufacturer's instructions.

For measuring earth surface temperatures with remote sensors, such as infra-red sensors, it is preferable that the sensor be maintained at substantially the same distance, or elevation above and at an angle of about 90° to the earth's surface for minimizing the effect of the intervening atmosphere, between the sensor and earth's surface, upon the measured temperatures. Atmospheric conditions, such as relative humidity, moisture, fog, haze, and so on have a substantial effect upon the temperature measured. This effect increases as the thickness of the atmosphere between the sensor and earth's surface increases. Preferably, the sensor is maintained at a distance above the earth's surface such that the conditions in the intervening atmosphere have no substantial effect upon the value of the earth's surface temperature measured. Distances between the sensor and the earth's surface of about 1 to 3 feet are preferred, although greater or lesser distances may be used if conditions warrant.

Infra-red sensors have a field of view expressed by an angle of view. Infra-red sensors receive radiation emitted within their field of view and thus record a temperature which as about average across the field of view. Infra -red sensors having an angle of view in the range of about 20–45 degrees sense the major portion of radiation from a skyward direction which will strike the earth's surface at a location and are, thus, satisfactory for use in measuring both earth surface and skyward temperatures.

EXAMPLE

The following example is provided to demonstrate the present invention. For this Example, a geographical area comprising the Katy Gas Field in South East Texas was selected. The Katy Gas Field is a known producing area which has a known temperature profile against which the results from the method of the present invention can be compared.

Earth surface and skyward temperatures were measured using two Omega Engineering Company OS-82-LT Infra-red Thermometers sensitive to radiation in the range of 8 to 14 Angstroms. Both infra-red thermometers were mounted on the front bumper of an automobile about two feet above the road surface. The infra-red thermometer for measuring earth surface temperatures was directed vertically downward at the road surface, and the infra-red thermometer for measuring skyward temperatures was directed vertically upward toward the sky. The terrain traversed was essentially flat, such that the infra-red thermometers did not change their vertical orientations due to changes in grade.

The automobile traversed the selected geographical area along paved highways at about 60 miles per hour. Earth surface and a skyward temperature measurements were made at locations at one-half mile intervals along each traverse.

In this Example, two traverses across the Katy Gas Field were made using the equipment and procedures described above. Both traverses were made at night under visually clear weather conditions. The two traverses, (traverse 1 and traverse 2), were separated by a time period of about two hours. Each traverse took about 27 minutes to complete. Data from the two traverses are shown in Table I.

Measured earth surface temperatures from traverse 1 are recorded in Table 1, column entitled "Traverse 1, Earth Surface Temp." and are plotted as curve 10 in FIG. 1 of the drawings. Likewise, measured earth surface temperatures from traverse 2 are recorded in Table 1, column "Traverse 2, Earth surface Temp.".

As can be seen in FIG. 1, the measured earth surface temperatures from traverse 1 and 2 do not correspond well. At most locations, substantial differences exist earth surface temperatures measured during traverse 1 and traverse 2. Additionally, the general shapes of curves 10 and 11 do not correspond. One could not gain any information concerning the presence or absence of subsurface features at any location from an inspection of curves 10 and 11.

According to my discoveries, variations in skyward temperatures above a location have a significant effect upon earth surface temperatures measured at the location. And, according to the present invention, measured earth surface temperatures can be compensated for such variations in skyward temperatures. The compensated earth surface temperatures can then be used to determine the likelihood of the existence of subsurface features beneath selected locations. In this example, compensated earth surface temperatures will be used to predict the likelihood of oil or gas deposits beneath locations along the path of the traverses.

In order to calculate compensated earth surface temperatures for the locations along the traverses, it was necessary that skyward temperatures were measured at the same time as the earth surface temperatures were measured. The measured skyward temperatures are recorded in Table I. Skyward temperatures from Traverse 1 are recorded in column "Traverse 1, Sky Temp." and Skyward temperatures from Traverse 2 are recorded in column "Traverse 2, Sky Temp.".

For this Example, normalized temperature values are used and normalized compensated earth surface temperatures are calculated. A normalized temperature, as used herein, is the difference between the measured temperature value and the average value for the set of measured temperatures to which the measured temperature belongs. For example, the normalized temperature for a skyward temperature measured at a location on Traverse 1 is the measured skyward temperature at the location minus the average of all skyward temperatures measured at the locations along Traverse 1. Normalized temperatures for the other measured temperatures from Traverse 1 and 2 are determined in the same way.

Normalized temperatures have the advantage that, for a measured temperature having a value less than the average value of the set to which it belongs the corresponding normalized temperature has a negative value. Likewise, for a measured temperature having a higher than average value, the normalized temperature has a positive value. Thus, by using normalized temperature values, it is easy to determine whether a particular temperature is above or below the average for its set.

The normalized skyward temperatures for Traverse 1 and 2 are recorded in Table I in, respectively, columns labeled "Traverse 1, Sky T-Tavg" and "Traverse 2, Sky T-Tavg.". Similarly, normalized earth surface temperatures for Traverses 1 and 2 are recorded in, respectively, columns labeled "Traverse 1, Earth Surface T-Tavg" and "Traverse 2, Earth Surface T-Tavg" of Table I.

A normalized compensated earth surface temperatures, $T_{NCL}$, is calculated for each measured earth surface temperature according to the formula:

$$T_{NCL}=T_{NL}-(C)(T_{NS})$$

Where $T_{NCL}$ is the normalized compensated earth surface temperature;

$T_{NL}$ is the normalized earth surface temperature;

$T_{NS}$ is the normalized skyward temperature at the same location as $T_{NL}$; and C is a constant proportional to the effect that a unit change in the value of $T_{NS}$ has upon the value of $T_{NL}$.

For this Example, the value of C, (0.25 degrees per degree), is the value which produces the best fit of the calculated values of $T_{NCL}$ of Traverse 1 and Traverse 2. The value of C was determined by a process of curve fitting. That is, a value of C was assumed and a value of $T_{NCL}$ for each measured earth surface temperature of Traverse 1 and Traverse 2 was calculated. Curves of $T_{NCL}$ from Traverse 1 and Traverse 2 were plotted on one graph and the curves were compared. The process was repeated with new values of C assumed until the curves for $T_{NCL}$ of Traverse 1 and 2 showed the best fit with each other.

Figure 2:
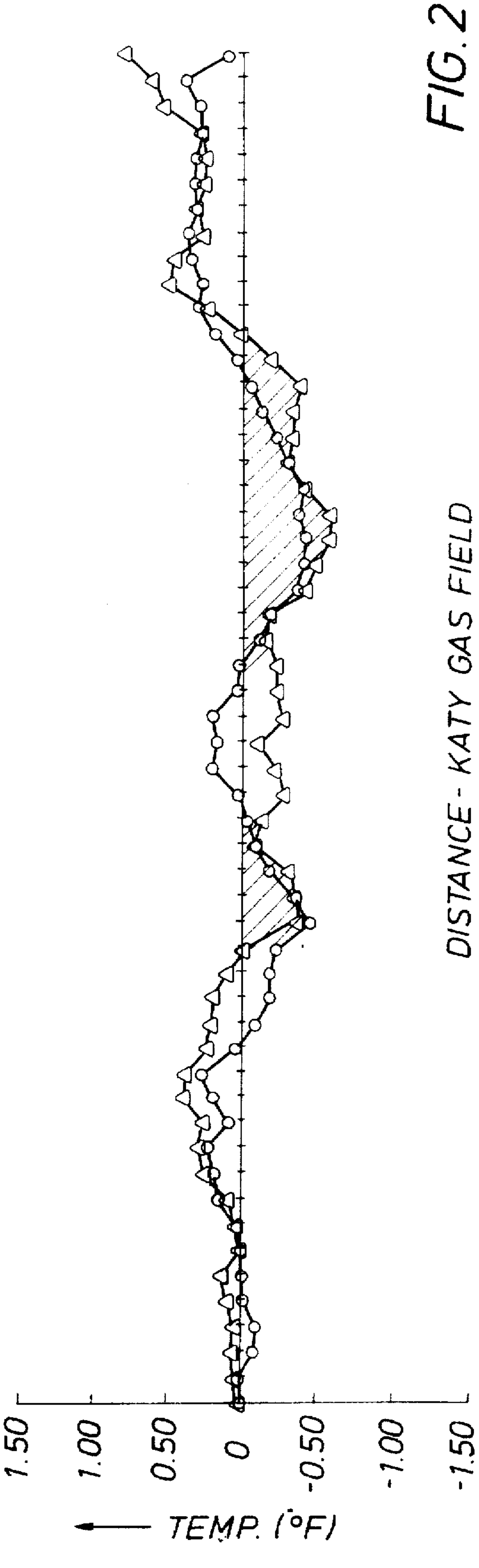
FIG. 2 of the drawings shows graphical plots of normalized compensated earth surface temperatures for locations along Traverse 1 and Traverse 2 of Example 1.

Values for normalized compensated earth surface temperatures, $T_{NCL}$, for Traverse 1 are recorded in Table 1, column labeled "Traverse 1, Compensated Temp." and are plotted as curve 100 in FIG. 2 of the drawings. Likewise, the values of $T_{NCL}$ for Traverse 2 are recorded in the column labeled "Traverse2, Compensated Temp." and are plotted as Curve 110 in FIG. 2 of the drawings.

Referring to FIG. 1 and 2 of the drawings, it can be seen that the values of the normalized earth surface temperatures, $T_{NCL}$, shown in curves 100 and 110 of FIG.2 show a better correspondence than do the values of the measured earth surface temperatures, $T_{CL}$, shown in curves 10 and 11 of FIG. 1. This improved correspondence in values of $T_{NCL}$ indicates that, by applying the method of the present invention to the measured earth surface temperatures of Traverse 1 and Traverse 2, much of the effect of variations in skyward temperatures has been removed from the earth surface temperature data. Thus, the values of $T_{NCL}$ for the locations in the geographical area traversed by Traverse 1 and 2 may be used to predict whether subsurface features exist beneath the locations.

In this Example, the geographical area selected, Katy Gas Field, is known to have gas deposits present. As described above in this specification, I have determined that locations having earth surface temperatures lower than average for the geographical area are likely to have oil or gas deposits beneath them, when the geographical area is an area where such oil or gas deposits might exist. In the same way, locations having normalized compensated earth surface temperatures of negative value are likely to have oil or gas deposits beneath them.

In FIG. 2, areas 120 and 130 encompass locations in the geographical area having normalized compensated earth surface temperatures, $T_{NCL}$, of negative value. Consequently, according to the present invention, locations within areas 120 and 130 are more likely to have gas deposits beneath them than are the locations outside the areas 120 and 130.

This example demonstrates that application of methods of the present invention to measured earth surface temperature data to compensate for the effect of variations in skyward temperatures produces compensated earth surface temperature data, $T_{CL}$ or $T_{NCL}$, for locations within a geographical area which is useful for predicting the presence or absence of subsurface features beneath the locations. By employing the methods disclosed herein, the required earth surface and skyward temperature measurements can be made rapidly such that large geographical areas can be surveyed in a fast, efficient and economical manner.

While the present invention has been described with reference to preferred embodiments, the same are to be considered illustrative only and not limiting in character, and that many modification to the methods of the present invention will occur to those skilled in the art without departing from the spirit and scope of the invention which is defined only by the appended claims.

TABLE I

| SKY | | EARTH SURFACE | | COMPENSATED |
|---|---|---|---|---|
| TEMP. °F. | T—T avg °F. | TEMP. °F. | T—T avg °F. | TEMP °F. |
| | | TRAVERSE 1 | | |
| -44.26 | 0.79 | 62.70 | 0.19 | -0.01 |
| -44.36 | 0.69 | 62.70 | 0.19 | 0.02 |
| -44.36 | 0.69 | 62.61 | 0.10 | -0.07 |
| -44.36 | 0.69 | 62.59 | 0.08 | -0.09 |
| -44.67 | 0.38 | 62.59 | 0.08 | -0.01 |
| -44.67 | 0.38 | 62.59 | 0.08 | -0.01 |
| -44.88 | 0.17 | 62.56 | 0.05 | 0.00 |
| -45.29 | -0.24 | 62.48 | -0.03 | 0.02 |
| -45.49 | -0.44 | 62.56 | 0.05 | 0.16 |
| -45.70 | -0.65 | 62.52 | 0.01 | 0.17 |
| -45.90 | -0.85 | 62.52 | 0.01 | 0.22 |
| -45.90 | -0.85 | 62.38 | -0.13 | 0.08 |
| -45.90 | -0.85 | 62.48 | -0.03 | 0.19 |
| -45.90 | -0.85 | 62.56 | 0.05 | 0.26 |
| -45.90 | -0.85 | 62.34 | -0.17 | 0.04 |
| -45.90 | -0.85 | 62.21 | -0.30 | -0.08 |
| -45.70 | -0.65 | 62.16 | -0.35 | -0.19 |
| -45.70 | -0.65 | 62.16 | -0.35 | -0.19 |
| -45.70 | -0.65 | 62.12 | -0.39 | -0.22 |
| -45.70 | -0.65 | 61.87 | -0.64 | -0.48 |

TABLE I-continued

| SKY | | EARTH SURFACE | | COMPENSATED |
|---|---|---|---|---|
| TEMP. °F. | T—T avg °F. | TEMP. °F. | T—T avg °F. | TEMP °F. |
| -45.70 | -0.65 | 62.02 | -0.49 | -0.33 |
| -45.70 | -0.65 | 62.16 | -0.35 | -0.19 |
| -45.70 | -0.65 | 62.30 | -0.21 | -0.04 |
| -45.49 | -0.44 | 62.38 | -0.13 | -0.02 |
| -45.70 | -0.65 | 62.38 | -0.13 | 0.03 |
| -45.90 | -0.85 | 62.48 | -0.03 | 0.19 |
| -45.90 | -0.85 | 62.45 | -0.06 | 0.15 |
| -45.90 | -0.85 | 62.48 | -0.03 | 0.18 |
| -45.90 | -0.85 | 62.32 | -0.19 | 0.02 |
| -45.90 | -0.85 | 62.32 | -0.19 | 0.02 |
| -45.70 | -0.65 | 62.23 | -0.28 | -0.12 |
| -45.70 | -0.65 | 62.14 | -0.37 | -0.21 |
| -45.70 | -0.65 | 61.98 | -0.53 | -0.37 |
| -45.49 | -0.44 | 61.96 | -0.55 | -0.44 |
| -45.08 | -0.03 | 62.07 | -0.44 | -0.43 |
| -44.88 | 0.17 | 62.16 | -0.35 | -0.39 |
| -44.67 | 0.38 | 62.21 | -0.30 | -0.39 |
| -44.36 | 0.69 | 62.38 | -0.13 | -0.31 |
| -44.26 | 0.79 | 62.48 | -0.03 | -0.23 |
| -44.06 | 0.99 | 62.63 | 0.12 | -0.13 |
| -44.06 | 0.99 | 62.70 | 0.19 | -0.06 |
| -44.06 | 0.99 | 62.79 | 0.28 | 0.03 |
| -44.06 | 0.99 | 62.93 | 0.41 | 0.17 |
| -44.26 | 0.79 | 62.99 | 0.48 | 0.28 |
| -44.26 | 0.79 | 62.97 | 0.46 | 0.26 |
| -44.26 | 0.79 | 63.02 | 0.51 | 0.32 |
| -44.26 | 0.79 | 63.06 | 0.55 | 0.35 |
| -44.26 | 0.79 | 63.02 | 0.51 | 0.31 |
| -44.26 | 0.79 | 63.02 | 0.51 | 0.31 |
| -44.36 | 0.69 | 62.99 | 0.48 | 0.31 |
| -44.36 | 0.69 | 62.95 | 0.44 | 0.27 |
| -44.36 | 0.69 | 62.97 | 0.46 | 0.29 |
| -44.36 | 0.69 | 63.06 | 0.55 | 0.38 |
| -43.85 | 1.20 | 62.92 | 0.41 | 0.11 |
| | | TRAVERSE 2 | | |
| -51.85 | -0.10 | 61.80 | 0.01 | 0.04 |
| -52.05 | -0.31 | 61.76 | -0.03 | 0.05 |
| -52.05 | -0.31 | 61.78 | -0.01 | 0.07 |
| -52.05 | -0.31 | 61.76 | -0.03 | 0.05 |
| -52.05 | -0.31 | 61.80 | 0.01 | 0.09 |
| -52.05 | -0.31 | 61.84 | 0.05 | 0.12 |
| -51.85 | -0.10 | 61.78 | -0.01 | 0.02 |
| -51.85 | -0.10 | 61.80 | 0.01 | 0.04 |
| -51.64 | 0.10 | 61.89 | 0.10 | 0.08 |
| -51.64 | 0.10 | 62.05 | 0.26 | 0.24 |
| -51.54 | 0.20 | 62.12 | 0.33 | 0.27 |
| -51.23 | 0.51 | 62.16 | 0.37 | 0.24 |
| -51.03 | 0.72 | 62.34 | 0.55 | 0.37 |
| -50.82 | 0.92 | 62.39 | 0.59 | 0.36 |
| -50.51 | 1.23 | 62.32 | 0.53 | 0.23 |
| -50.41 | 1.33 | 62.30 | 0.51 | 0.18 |
| -50.41 | 1.33 | 62.30 | 0.51 | 0.17 |
| -50.21 | 1.54 | 62.27 | 0.48 | 0.09 |
| -50.21 | 1.54 | 62.16 | 0.37 | -0.01 |
| -50.21 | 1.54 | 61.78 | -0.01 | -0.39 |
| -50.21 | 1.54 | 61.80 | 0.01 | -0.37 |
| -50.21 | 1.54 | 61.84 | 0.05 | -0.34 |
| -50.41 | 1.33 | 62.03 | 0.23 | -0.10 |
| -50.41 | 1.33 | 61.98 | 0.19 | -0.14 |
| -50.41 | 1.33 | 61.84 | 0.05 | -0.29 |
| -50.41 | 1.33 | 61.89 | 0.10 | -0.23 |
| -50.51 | 1.23 | 61.98 | 0.19 | -0.12 |
| -50.62 | 1.13 | 61.78 | -0.01 | -0.29 |
| -50.82 | 0.92 | 61.78 | -0.01 | -0.24 |
| -51.03 | 0.72 | 61.73 | -0.06 | -0.24 |
| -51.03 | 0.72 | 61.80 | 0.01 | -0.17 |
| -51.44 | 0.31 | 61.69 | -0.10 | -0.17 |
| -51.64 | 0.10 | 61.37 | -0.42 | -0.45 |
| -51.85 | -0.10 | 61.26 | -0.53 | -0.50 |
| -52.05 | -0.31 | 61.12 | -0.67 | -0.60 |
| -52.26 | -0.52 | 61.06 | -0.73 | -0.60 |
| -52.46 | -0.72 | 61.17 | -0.62 | -0.44 |
| -52.46 | -0.72 | 61.30 | -0.49 | -0.31 |

TABLE I-continued

| SKY | | EARTH SURFACE | | COMPENSATED |
|---|---|---|---|---|
| TEMP. °F. | T—T avg °F. | TEMP. °F. | T—T avg °F. | TEMP °F. |
| −52.56 | −0.82 | 61.24 | −0.55 | −0.34 |
| −52.56 | −0.82 | 61.24 | −0.55 | −0.34 |
| −52.87 | −1.13 | 61.10 | −0.69 | −0.41 |
| −53.08 | −1.34 | 61.26 | −0.53 | −0.20 |
| −53.08 | −1.34 | 61.44 | −0.35 | −0.02 |
| −53.28 | −1.54 | 61.62 | −0.17 | 0.21 |
| −53.59 | −1.85 | 61.80 | 0.01 | 0.47 |
| −53.59 | −1.85 | 61.76 | −0.03 | 0.44 |
| −53.28 | −1.54 | 61.66 | −0.13 | 0.25 |
| −53.08 | −1.34 | 61.76 | −0.03 | 0.30 |
| −52.87 | −1.13 | 61.76 | −0.03 | 0.25 |
| −53.08 | −1.34 | 61.69 | −0.10 | 0.24 |
| −52.87 | −1.13 | 61.78 | −0.01 | 0.27 |
| −52.87 | −1.13 | 62.03 | 0.23 | 0.52 |
| −52.67 | −0.92 | 62.16 | 0.37 | 0.60 |
| −52.67 | −0.92 | 62.34 | 0.55 | 0.78 |

I claim and wish to protect by Letters Patent:

1. A method for selecting locations, among a plurality of locations, in a geographical area, which are likely to have oil or gas deposits beneath them, which method comprises:

a). selecting the geographical area beneath which oil or gas deposits might be found and selecting the plurality of locations within the geographical area;

b). measuring an earth surface temperature, $T_L$ at each location of the plurality of locations within the geographical area, and simultaneously measuring a skyward temperature, $T_S$, in a vertical direction above each location;

c). determining an average, $T_{SA}$, of the skyward temperatures, $T_S$, measured at the plurality of locations;

d). determining a normalized temperature, $T_{NS}$, for each measured skyward temperature, $T_S$, according to the equation: $T_{NS}=T_{SA}-T_S$;

e). determining, for each location of the plurality of locations, a compensated earth surface temperature, $T_{CL}$ according to the formula:

$$T_{CL}=T_L-(C)(T_{NS});$$

where (C) is a constant proportional to the effect of a variation in the measured skyward temperature, $T_S$, at the respective location upon the measured earth surface temperature, $T_L$;

f). determining an average value, $T_{CLA}$, for the compensated earth surface temperatures, $T_{CL}$, of the plurality of locations; and g). selecting locations, among the plurality of locations, having compensated earth surface temperatures, $T_{CL}$ less than the average value, $T_{CLA}$ as locations likely to have oil or gas deposits beneath them.

2. The method of claim 1, including, a step for calculating the value for constant (C) at any location, of the plurality of locations, comprising the sub steps:

h). measuring, at a first time, a first earth surface temperature, $T_{L-1}$, and a first skyward temperature, $T_{S-1}$, at the location;

i) measuring, at a second time, a second earth surface temperature, $T_{L-1}$, and a second skyward temperature, $T_{S-2}$, at the location; and j). calculating a value of (C) according to the formula:

$$C=(T_{L-1}-T_{L-2})/(T_{S-2}-T_{S-1}).$$

3. The method of claim 2, including, calculating the value of (C) for each location of of the plurality of locations.

4. The method of claim 3, including, selecting a single value of (C), out of all the calculated values of C, which best fits the calculations of values of $T_{CL}$ for all locations of the plurality of locations.

5. The method of claim 1, including measuring the earth surface temperatures and of the skyward temperatures for the plurality of locations during a time period during which diurnal changes and weather changes have no substantial effect upon measured earth surface temperatures at the plurality of locations.

6. A method for selecting locations, among a plurality of locations, in a geographical area, which likely to have oil or gas deposits beneath them, which method comprises:

a). selecting the geographical area of interest which is likely to have oil or gas deposits;

b). selecting the plurality of locations within the geographical area of interest;

c). at each location of the plurality of locations, measuring an earth surface temperature, $T_L$, and, simultaneously, measuring a skyward temperature, $T_S$, vertically above the location;

d). determining an average skyward temperature, $T_{SA}$, for the skyward temperatures, $T_S$, measured at the plurality of locations;

e). determining an average measured earth surface temperature, $T_{LA}$, for the earth surface temperatures, $T_L$, measured at the plurality of locations;

f). determining a normalized skyward temperature, $T_{NS}$, for each measured skyward temperature, $T_S$, according to the formula: $T_{NS}=T_{SA}-T_S$;

g). determining a normalized earth surface temperature $T_{NL}$, for each measured earth surface temperature, $T_L$, according to the formula:

$$T_{NL}=T_L-T_{LA}$$

h). determining for each location of the plurality of locations a normalized compensated earth surface temperature, $T_{NCL}$, according to the formula:

$$T_{NCL}=T_{NL}-(C)(T_{NS})$$

where (C) is a constant proportional to the effect of a variation in the measured skyward temperature, $T_S$, upon the measured earth surface temperature, $T_L$, at the location; and i). selecting locations, among the plurality of locations, having normalized compensated earth surface temperatures, $T_{NCL}$, of negative value as locations likely to have oil or gas deposits beneath them.

7. The method of claim 6, including, a step for calculating the value of constant (C) at a location, of the plurality of locations, comprising:

for a first time, determining a first normalized earth surface temperature, $T_{NL-1}$, and a first normalized skyward temperature, $T_{NS-}$, for the location;

for a second time, determining a second normalized earth surface temperature, $T_{NL-2}$, and a second normalized skyward temperature, $T_{NS-2}$, for the location; and calculating a value of (C) according to the formula:

$$C=(T_{NL-1}-T_{NL-2})/(T_{NS-2}-T_{NS-1}).$$

8. The method of claim 6, including measuring the earth surface temperatures and the skyward temperatures for the plurality of locations during a time period during which diurnal changes and weather changes have no substantial effect upon measured earth surface temperatures at the plurality of locations.

9. A method for selecting locations, among a plurality of locations, in a geographical area, which are likely to have mineral deposits, which method comprises:

a). selecting the geographical area within which mineral deposits might be found, and selecting the plurality of locations within the geographical area;

b). measuring an earth surface temperature, $T_L$, at each location of the plurality of locations within the geographical area, and simultaneously measuring a skyward temperature, $T_S$, in a vertical direction above each location;

c). determining an average, $T_{SA}$, of the skyward temperatures, $T_S$, measured at the plurality of locations;

d). determining a normalized temperature, $T_{NS}$, for each measured skyward temperature, $T_S$, according to the equation: $T_{NS}=T_{SA}-T_S$;

e). determining, for each location of the plurality of locations, a compensated earth surface temperature, $T_{CL}$, according to the formula:

$$T_{CL}=T_L-(C)(T_{NS});$$

where (C) is a constant proportional to the effect of a variation in the measured skyward temperature, $T_S$, at the respective location upon the measured earth surface temperature, $T_L$;

f). determining an average value, $T_{CLA}$, for the compensated earth surface temperatures, $T_{CL}$, of the plurality of locations; and g). selecting locations, among the plurality of locations, having compensated earth surface temperature, $T_{CL}$ values higher than the average value, $T_{CLA}$ as locations likely to have mineral deposits beneath them;

h). determining an average value, $T_{CLA}$, for the compensated earth surface temperatures, $T_{CL}$, of the plurality of locations; and i) selecting locations, among the plurality of locations, having compensated earth surface temperatures, $T_{CL}$, higher than the average value, $T_{CLA}$, as locations likely to have mineral deposits beneath them.

10. The method of claim 9, including, a step for calculating the value for constant (C) at any location, of the plurality of locations, comprising the sub steps:

i). measuring, at a first time, a first earth surface temperature, $T_{L-1}$, and a first skyward temperature, $T_{S-1}$, at the location;

j). measuring, at a second time, a second earth surface temperature, $T_{L-2}$, and a second skyward temperature, $T_{S-2}$, at the location; and k). calculating a value of (C) according to the formula:

$$C=(T_{L-1}-T_{L-2})/(T_{S-2}-T_{S-1}).$$

11. The method of claim 10, including, calculating the value of (C) for each location of the plurality of locations.

12. The method of claim 11, including, selecting a single value of (C), out of all the calculated values of C, which best fits the calculations of values of $T_{CL}$ for all locations of the plurality of locations.

13. The method of claim 9, including measuring the earth surface temperatures and skyward temperatures for the plurality of locations during a time period during which diurnal changes and weather changes have no substantial effect upon measured earth surface temperatures at the plurality of locations.

14. A method for selecting locations, among a plurality of locations, in a geographical area, which are likely to have mineral deposits beneath them, which method comprises:

a). selecting the geographical area of interest which is likely to have mineral deposits;

b). selecting the plurality of locations within the geographical area of interest;

c). at each location of the plurality of locations, measuring an earth surface temperature, $T_L$, and, simultaneously, measuring a skyward temperature, $T_S$, vertically above the location;

d). determining an average skyward temperature, $T_{SA}$, for the skyward temperatures, $T_S$, measured at the plurality of locations;

e). determining an average measured earth surface temperature, $T_{LA}$, for the earth surface temperatures, $T_L$, measured at the plurality of locations;

f). determining a normalized skyward temperature, $T_{NS}$, for each measured skyward temperature, $T_S$, according to the formula:

$$T_{NS}=T_{SA}-T_S;$$

g) determining a normalized earth surface temperature $T_{NL}$, for each measured earth surface temperature, $T_L$, according to the formula:

$$T_{NL}=T_L-T_{LA}$$

h). determining for each location of the plurality of locations a normalized compensated earth surface temperature, $T_{NCL}$, according to the formula:

$$T_{NCL}=T_{NL}-(C)(T_{NS})$$

where (C) is a constant proportional to the effect of a variation in the measured skyward temperature, $T_S$, upon the measured earth surface temperature, $T_L$, at the location; and i). selecting locations, among the plurality of locations, having normalized compensated earth surface temperatures, $T_{NCL}$, of positive value as locations likely to have mineral deposits beneath them.

15. The method of claim 14, including, a step for calculating the value of constant (C) at a location, of the plurality of locations, comprising:

for a first time, determining a first normalized earth surface temperature $T_{NL-1}$, and a first normalized skyward temperature, $T_{NS-1}$, for the location;

for a second time, determining a second normalized earth surface temperature, $T_{NL-2}$, and a second normalized skyward temperature, $T_{NS-2}$, for the location; and calculating a value of (C) according to the formula:

$$C=(T_{NL-1}-T_{NL-2})/(T_{NS-2}-T_{NS-1}).$$

16. The method of claim 14, including measuring the earth surface temperatures and the skyward temperatures for the plurality of locations during a time period during which diurnal changes and weather changes have no substantial effect upon measured earth surface temperatures at the plurality of locations.

* * * * *